United States Patent
Peyron et al.

(10) Patent No.: US 10,745,140 B2
(45) Date of Patent: Aug. 18, 2020

(54) LOCKING DEVICE FOR PIVOTING COWLS OF A THRUST REVERSER

(71) Applicant: Safran Nacelles, Gonfreville l'Orcher (FR)

(72) Inventors: Vincent Peyron, Gonfreville l'Orcher (FR); Serge Bunel, Gonfreville l'Orcher (FR); Pascal Soulier, Gonfreville l'Orcher (FR); Arnaud Bonny, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 500 days.

(21) Appl. No.: 15/829,131

(22) Filed: Dec. 1, 2017

(65) Prior Publication Data
US 2018/0079517 A1 Mar. 22, 2018

Related U.S. Application Data

(63) Continuation of application No. PCT/FR2016/051336, filed on Jun. 3, 2016.

(30) Foreign Application Priority Data

Jun. 3, 2015 (FR) .................................. 15 55065

(51) Int. Cl.
*B64D 29/06* (2006.01)
*B64D 29/00* (2006.01)
(Continued)

(52) U.S. Cl.
CPC ............ *B64D 29/06* (2013.01); *B64D 29/00* (2013.01); *E05B 65/06* (2013.01); *E05C 1/00* (2013.01);
(Continued)

(58) Field of Classification Search
CPC . E05C 7/04; E05C 7/045; F02K 1/766; B64D 29/06
See application file for complete search history.

(56) References Cited

U.S. PATENT DOCUMENTS 4,629,146 A * 12/1986 Lymons ................. B64D 29/08
                                                                180/69.2
6,227,485 B1 * 5/2001 Porte ...................... B64D 29/08
                                                                244/53 B
(Continued)

FOREIGN PATENT DOCUMENTS

FR          2622930         5/1989
FR          2771710         6/1999
(Continued)

OTHER PUBLICATIONS

International Search Report for International Application PCT/FR2016/051336, dated Oct. 6, 2016.

*Primary Examiner* — Brian M O'Hara
*Assistant Examiner* — Michael B. Kreiner
(74) *Attorney, Agent, or Firm* — Burris Law, PLLC

(57) ABSTRACT

The present disclosure provides a device for locking a first cowling and a second cowling of a thrust reverser of an aircraft propulsion assembly. The cowlings are mounted such that each cowl pivots around a longitudinal axis between a closed flight position and an open maintenance position. The locking device includes a telescopic connecting rod having at least one sliding shaft, a locking mechanism on a proximal end of a shaft on the second cowling, and a connecting rod support. The connecting rod support or the tubular element includes two walls each delimiting a hole, and the tubular element of the connecting rod or the connecting rod support has two support fingers which each extend longitudinally on a side of the tubular element into a hole. The holes engage with the support fingers when the cowlings are open and allow free movement of the support fingers in a closed-cowlings configuration.

10 Claims, 3 Drawing Sheets

(51) Int. Cl.
　　　*E05B 65/06*　　　(2006.01)
　　　*E05C 1/00*　　　(2006.01)
　　　*E05C 7/04*　　　(2006.01)
　　　*B64C 7/02*　　　(2006.01)
　　　*F02K 1/64*　　　(2006.01)
(52) U.S. Cl.
　　　CPC .............. *E05C 7/04* (2013.01); *B64C 7/02* (2013.01); *F02K 1/64* (2013.01)

(56) References Cited

U.S. PATENT DOCUMENTS

| | | | | |
|---|---|---|---|---|
| 7,843,363 | B2* | 11/2010 | Grichener | B64D 29/06 340/426.29 |
| 8,573,928 | B2* | 11/2013 | Soulier | B64D 29/06 415/126 |
| 9,776,726 | B2* | 10/2017 | Beardsley | F02K 1/06 |
| 9,878,797 | B2* | 1/2018 | Ambite Iglesias | B64D 29/06 |
| 10,670,063 | B2* | 6/2020 | Artin | E05C 17/30 |
| 2016/0069118 | A1* | 3/2016 | Artin | F16B 7/105 16/85 |
| 2016/0229546 | A1* | 8/2016 | Chavignier | F16H 25/2021 |

FOREIGN PATENT DOCUMENTS

| | | |
|---|---|---|
| FR | 2920144 | 2/2009 |
| FR | 2920174 | 2/2009 |
| FR | 2920177 | 2/2009 |
| FR | 2920178 | 2/2009 |

\* cited by examiner

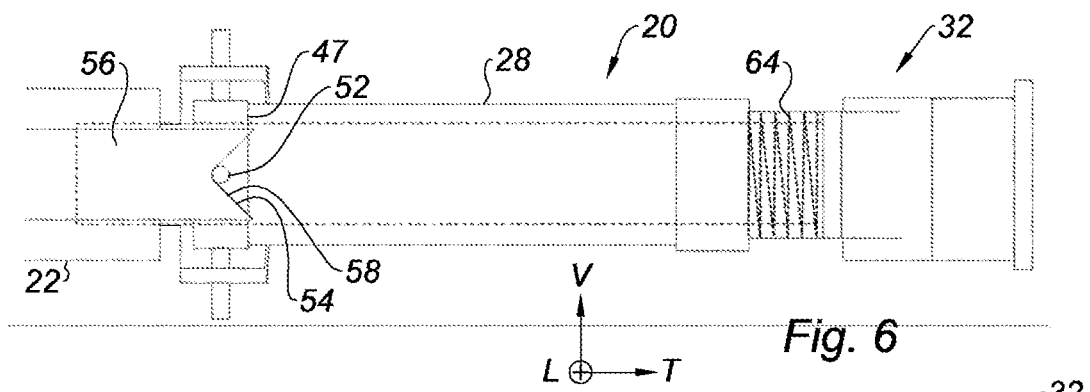
Fig. 6
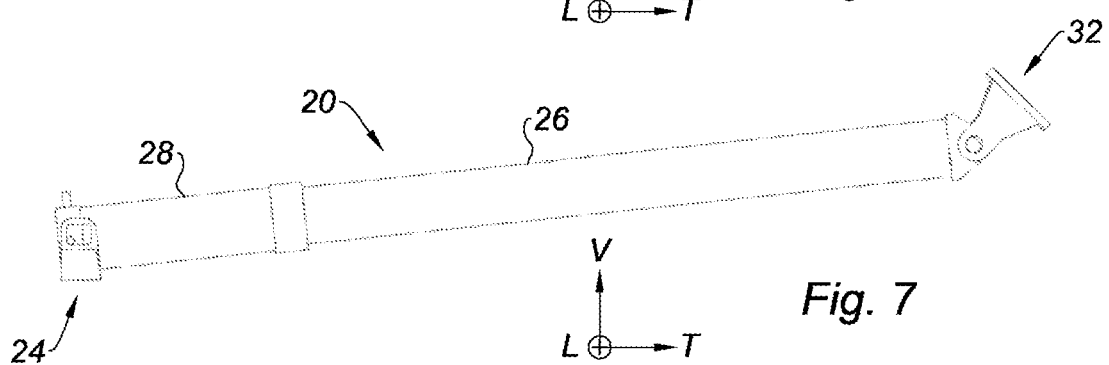
Fig. 7
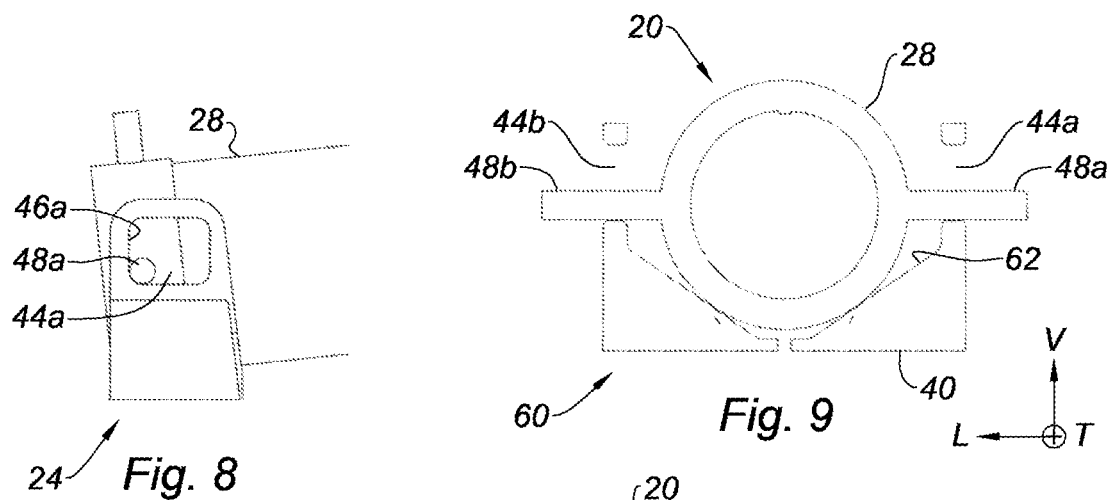
Fig. 8
Fig. 9
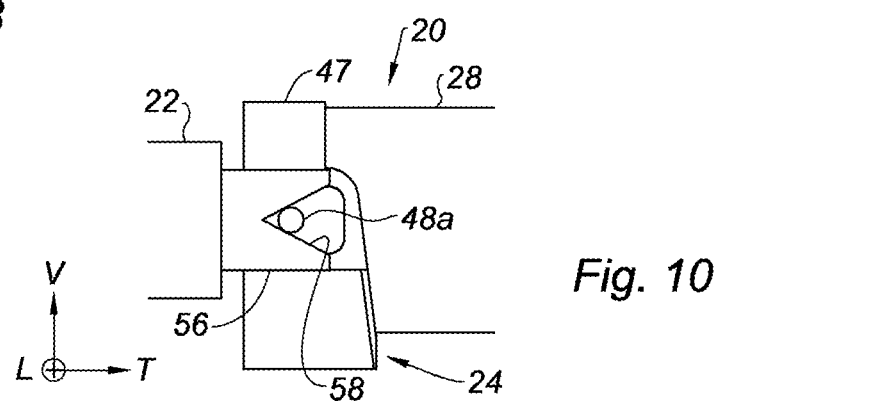
Fig. 10

LOCKING DEVICE FOR PIVOTING COWLS OF A THRUST REVERSER

CROSS-REFERENCE TO RELATED APPLICATIONS

This application is a continuation of International Application No. PCT/FR2016/051336, filed on Jun. 3, 2016, which claims priority to and the benefit of FR 15/55065 filed on Jun. 3, 2015. The disclosures of the above applications are incorporated herein by reference.

FIELD

The present disclosure relates to a locking device of a first cowl and a second cowl of a thrust reverser of an aircraft propulsion unit.

BACKGROUND

The statements in this section merely provide background information related to the present disclosure and may not constitute prior art.

The propulsion units for aircrafts generally include a nacelle forming a generally circular outer envelope, comprising inside a turbojet engine arranged along the longitudinal axis of this nacelle.

The turbojet engine receives the fresh air coming from the upstream side, or the front side, and rejects from the downstream side, or rear side, the hot gases coming from the combustion of fuel, which give a certain thrust.

The turbofan engines have around the motor fan blades generating a significant secondary cold air flow along an annular flow path passing between this motor and the nacelle, which adds a high thrust during normal operation providing a direct jet.

Some nacelles include a thrust reverser system which closes at least partially the annular cold air flow path, and rejects the secondary flow forwards while forming a reverse jet which generates a braking counter-thrust of the aircraft.

A known type of nacelle, presented particularly by the document FR-A1-2920144, includes two half-cowls covering the middle section surrounding the secondary flow fan, called hereinafter cowls, including a hinge having a longitudinal axis located at the upper portion, so as to allow an opening of these cowls for maintenance operations.

To guarantee the structural strength of the two cowls, a locking device is known, which includes a telescopic connecting rod, the connecting rod comprising a rod which is slidably mounted along a generally transverse axis, in a tubular element, between a retracted position corresponding to a closed cowls configuration and a deployed position corresponding to an open cowls configuration.

The movable rod of the connecting rod has a distal end which is linked on the first cowl, and a proximal end which is adapted to be linked on the second cowl via a locking means.

The locking means is designed to interlock the cowls in their closed position, by blocking the movable rod of the connecting rod.

Furthermore, the locking device includes an assembly allowing linking the connecting rod on a fixed portion of the propulsion unit, for example on the mast of the aircraft or on the motor, this assembly comprising a bracket, a vertical rod and a yoke joint.

The bracket is fastened on the mast, or on the motor, and the vertical rod is mounted in a pendulating manner on the bracket about a longitudinal pivot axis.

The yoke joint is slidably mounted vertically and pivoting on the vertical rod, about a vertical axis perpendicular to the sliding axis of the connecting rod.

In addition, the yoke joint is pivotally mounted on the connecting rod about a longitudinal axis, perpendicular to the sliding axis of the connecting rod.

To ensure maintenance of the support function of the connecting rod and the yoke joint, the vertical rod is equipped with a stop which allows supporting the yoke joint which is driven downwardly in the open cowls configuration.

Upon closing the cowls, the connecting rod is engaged in the locking system via ramps which recenter the connecting rod vertically.

Also, to stabilize the locking device in flight, the locking device includes a spring which is interposed axially between the free end of the movable rod of the connecting rod and the tubular element of the connecting rod.

A disadvantage of this type of locking device is that the connecting rod is linked, in the flight phase, both to the movable cowls, by both ends of the sliding rod of the connecting rod, and to the motor, or to the mast, by means of the yoke joint and the bracket.

The cowls, the motor and the mast have different frequencies and vibration levels, so that the connecting rod and the locking means are subjected to severe vibration environment which may reduce the longevity of the locking device.

Furthermore, this type of locking device is hardly adapted to a configuration in which the yoke joint must be fastened on the motor, which may be the case when the mast is too far from the locking means or is not accessible because hidden by the equipment.

Indeed, the motor is arranged under the locking means, while the mast is arranged above the locking means, so that the vertical rod, which is pivotally mounted on the yoke joint, will tend to naturally pivot forwards or backwards under the effect of gravity.

To limit the tilting of the vertical rod, the addition of angular stops will be necessary, these stops must allow keeping a freedom of displacement of the yoke joint along to longitudinal axis relative to the connecting rod during the flight phases.

The position of the connecting rod in the open cowls configuration will be uncertain, which will call for providing more substantial recentering ramps to ensure the engagement of the connecting rod with the locking means upon closing the cowls.

SUMMARY

The present disclosure provides a locking device of a first cowl and a second cowl of a thrust reverser of an aircraft propulsion unit, said cowls being each pivotally mounted about a longitudinal axis, between a flight closed position and a maintenance open position, the locking device including:

a telescopic connecting rod which comprises at least one rod which is slidably mounted along a generally transverse axis, in a tubular element, between a retracted position corresponding to a closed cowls configuration and a deployed position corresponding to an open cowls configuration, and which has a distal end linked to the first cowl and a proximal end adapted to be linked on the second cowl;

a locking mechanism of the proximal end of the rod on the second cowl, which is designed to interlock said cowls in their closed position; and a connecting rod support which is mounted on a fixed portion of the propulsion unit and which is designed to support the connecting rod at least in an open cowls configuration, characterized in that the connecting rod support, or the tubular element of the connecting rod, includes two walls, each extending on either side of the tubular element of the connecting rod, and each delimiting a slot, and in that the tubular element of the connecting rod, or respectively the connecting rod support, carries two support fingers, each extending generally longitudinally on either side of the tubular element, in one of said slots, said slots being adapted to cooperate with the support fingers when the cowls are open and to allow a free displacement of the support fingers in a closed cowls configuration.

Thus, in the closed cowls flight configuration, the telescopic connecting rod is not in contact with the rod support, whereby the connecting rod does not transmit force or vibration to the fixed portion of the propulsion unit.

More specifically, in this closed cowls flight configuration:

either the support fingers of the connecting rod are carried by the tubular element of the connecting rod and are not in contact with the walls delimiting the slots carried by the connecting rod support, whereby the support fingers of the connecting rod do not transmit force to the fixed portion of the propulsion unit;

either the support fingers of the connecting rod are carried by the connecting rod support and are not in contact with the walls delimiting the slots therefore carried by the tubular element of the connecting rod, whereby still the support fingers of the connecting rod do not transmit force to the fixed portion of the propulsion unit.

According to another feature, the locking device comprises a first centering device of the connecting rod including at least one centering pin which extends perpendicularly to the connecting rod, from the tubular element of the connecting rod, and an associated first seat and which has a V-shaped notch adapted to cooperate with the centering pin to guide the connecting rod in a centered position relative to the locking mechanism and to block the tubular element of the connecting rod in transverse translation and in rotation about the axis of the connecting rod in a closed cowls configuration.

The rotational blocking inhibits the connecting rod from rotating during the flight and the fingers do not come in contact with the walls delimiting the slots.

Advantageously, the first centering device promotes the engagement of the movable rod of the connecting rod in the locking mechanism, during the closing of the cowls.

According to one form, the first seat of the first centering device and the locking mechanism are secured to the second movable cowl.

In addition, the tubular element of the connecting rod has a proximal end which includes a ring, said ring carrying the centering pin and the two support fingers.

According to a variant, the centering pin of the first centering device is formed by one of said support fingers of the connecting rod.

This variant allows eliminating the centering pin.

The device comprises a second centering device of the connecting rod including a second seat which is secured to a fixed portion of the propulsion unit and which has a face with generally V-shaped longitudinal section adapted to cooperate with the tubular element of the connecting rod in order to guide the connecting rod in a centered position relative to the locking mechanism, in an open cowls configuration.

The second centering device promotes the engagement of the movable rod of the connecting rod in the locking mechanism, while maintaining the rod in a centered position in the open cowls configuration.

According to another aspect, the locking device comprises an elastic return element which is interposed transversely between the sliding rod and the tubular element associated with the connecting rod.

The elastic return element allows stabilizing the connecting rod in the closed cowls flight configuration.

According to one form, the locking device comprises a fuse element which is interposed between the connecting rod and the fixed portion of the propulsion unit and which is designed to yield beyond a certain force in case of blocking of the connecting rod during the opening or the closure of the movable cowls.

According to one variation, the fixed portion of the propulsion unit, on which the connecting rod support is mounted, is a mast intended to link the nacelle of the aircraft.

According to another variation, the fixed portion of the propulsion unit, on which the connecting rod support is mounted, belongs to a motor of the propulsion unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a schematic top view illustrating a telescopic connecting rod in a closed cowls configuration and a first centering device of the connecting rod according to the present disclosure;

FIG. 7 is a schematic rear view illustrating a deployed telescopic connecting rod in an open cowls configuration according to the present disclosure;

FIG. 8 is a schematic rear view illustrating in detail the connecting rod support of FIG. 7;

FIG. 9 is a schematic longitudinal sectional side view illustrating a second centering device of a connecting rod in an open cowls configuration according to the present disclosure; and FIG. 10 is a schematic rear view illustrating a variant of a connecting rod and connecting rod support according to the present disclosure.

Figure 1:
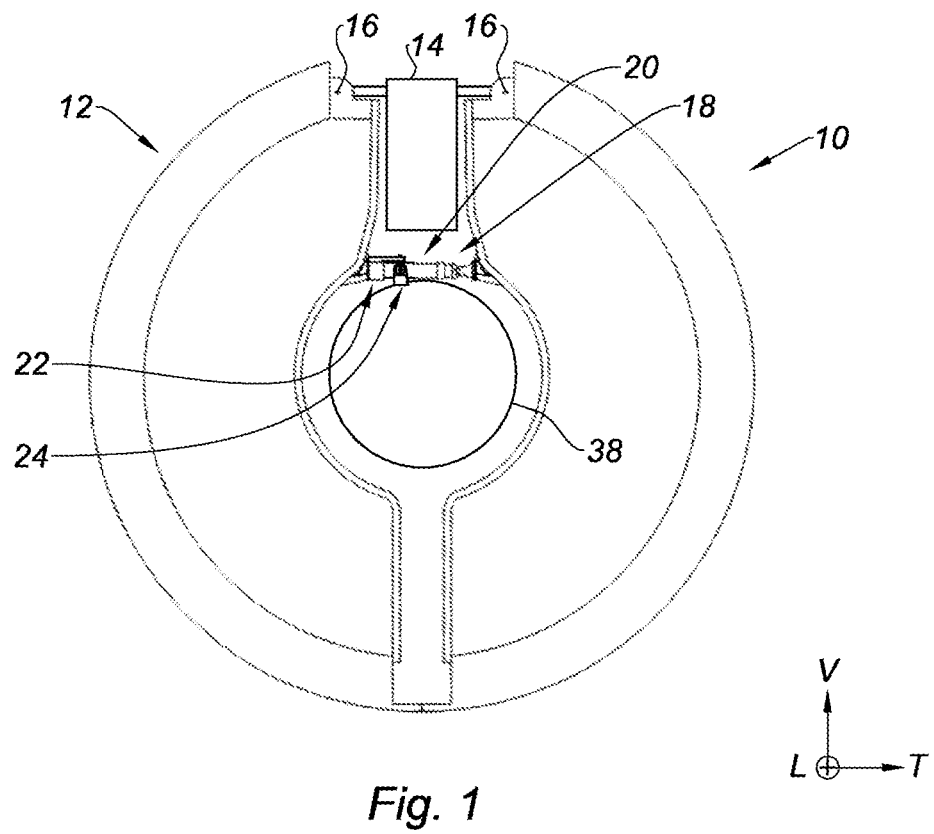
FIG. 1 is a schematic rear overview illustrating a first cowl and a second cowl of a turbojet engine nacelle in a closed position and equipped with a locking device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, to clarify the description and the claims, the terminology longitudinal, vertical and transverse will be adopted without limitation with reference to the trihedron L, V, T indicated in the figures, whose longitudinal axis L is parallel to the axis of the nacelle.

In all of these figures, identical or similar reference numerals represent identical or similar members or assemblies of members.

FIG. 1 shows a first cowl 10 and second cowl 12 of a propulsion unit, the propulsion unit comprising a nacelle which integrates a turbojet engine and which is supported by a pylon 14, or mast, fastened under the wing of an aircraft.

The nacelle includes a front section comprising a profiled air inlet, a central section which surrounds the cold air fan and which includes the two cowls 10, 12, carrying flaps of the thrust reverser.

Without limitation, the present disclosure also applies to a nacelle devoid of thrust reverser.

The nacelle forms an outer profiling of the annular flow path guiding the cold air flow, and an aerodynamic outer fairing.

The two cowls 10, 12 are arranged symmetrically with respect to a vertical axial plane, and may be laterally open by pivoting around a hinge 16, each comprising a longitudinal axis arranged in the upper portion.

Figure 2:
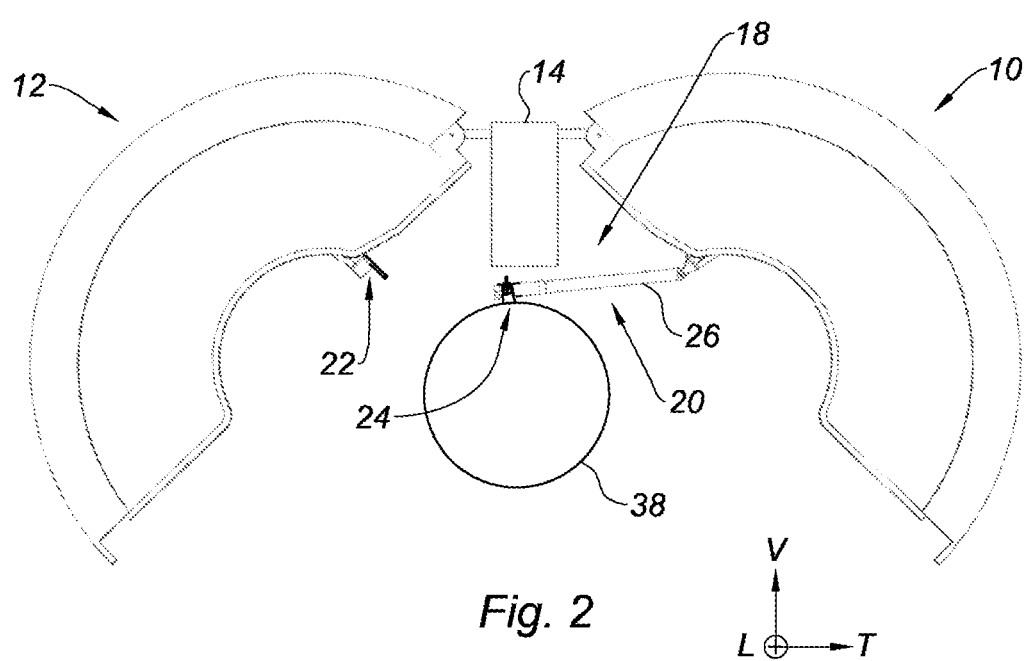
FIG. 2 is a schematic rear overview illustrating the cowls of FIG. 1 in a maintenance open position according to the present disclosure.

The cowls 10, 12 are pivotally mounted between a flight closed position, illustrated in FIG. 1, and a maintenance open position, illustrated in FIG. 2.

The nacelle is equipped with a locking device 18 which includes a telescopic connecting rod 20, a locking mechanism 22 of the connecting rod 20 and a connecting rod support 24.

Figure 3:
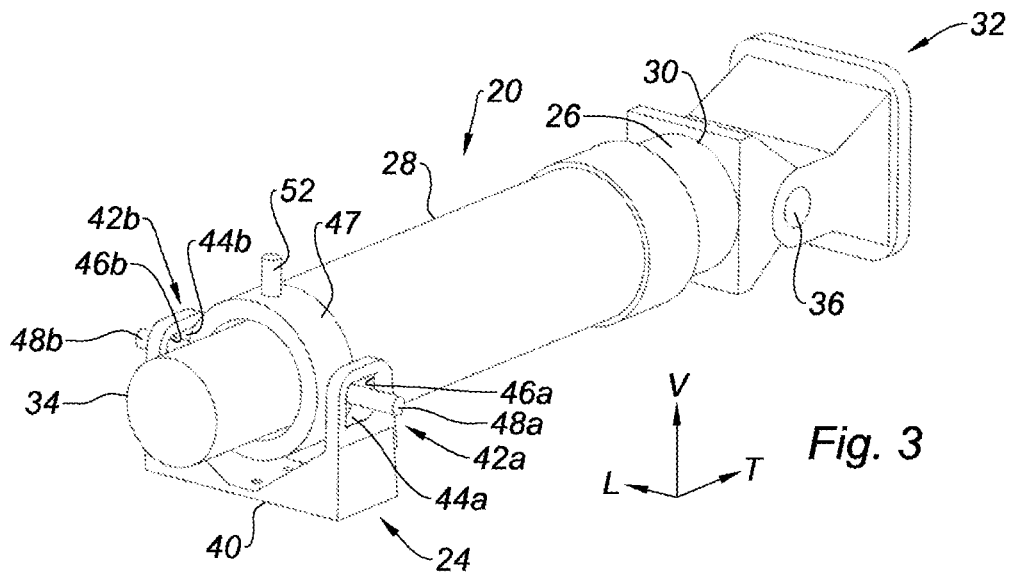
FIG. 3 is a schematic detail view in perspective illustrating a telescopic connecting rod of a locking device in a closed cowls configuration according to the present disclosure.
Figure 4:
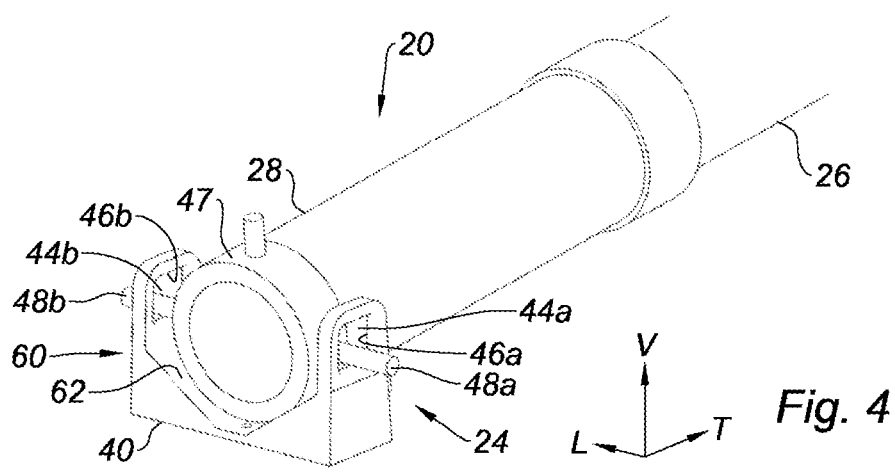
FIG. 4 is a schematic detail view in perspective illustrating a telescopic connecting rod of a locking device in an open cowls configuration according to the present disclosure.
Figure 5:
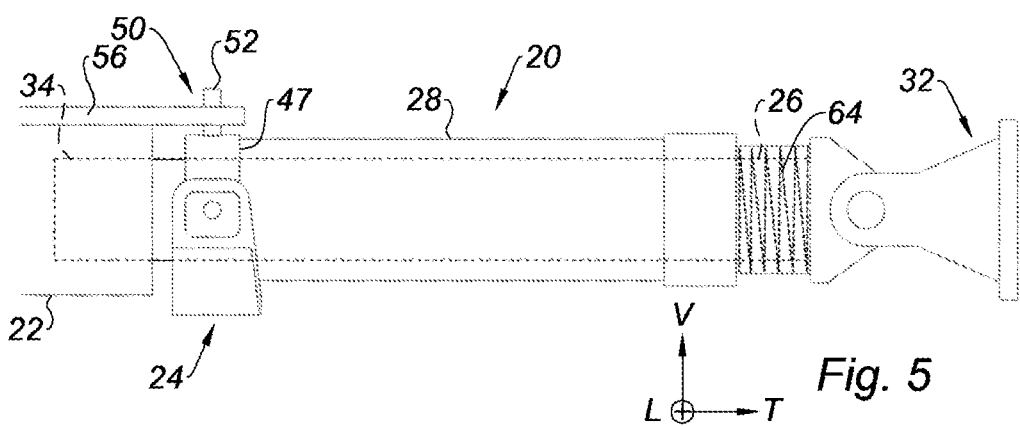
FIG. 5 is a schematic rear view illustrating a telescopic connecting rod in a closed cowls configuration and a first centering device of a connecting rod according to the present disclosure.

The connecting rod 20 comprises a telescopic rod 26, which is shown schematically in a single portion in the figures for the sake of simplification, and which is slidably mounted along a generally transverse axis in a complementary tubular element 28, between a retracted position corresponding to a closed cowls configuration, shown in FIGS. 3, 5, and 6, and a deployed position corresponding to an open cowls configuration, shown in FIGS. 4, 7, 8 and 9.

The sliding rod 26 has a distal end 30 linked to the first cowl 10 via a joint 32, and a proximal end 34 adapted to be linked on the second cowl 12 via the locking mechanism 22.

The joint 32 has the shape of a yoke which is fastened on the first cowl 10 and which is pivotally mounted on the distal end 30 of the rod 26 about a longitudinal joint axis 36.

The locking mechanism 22 is mounted on the second cowl 12, the locking mechanism 12 being designed to lock the proximal end 34 of the rod 26 on the second cowl 12, in order to interlock the cowls 10, 12 in their closed position.

To this end, the locking mechanism 22 is for example a lock which cooperates with the proximal end 34 of the rod 26.

The connecting rod support 24 is mounted on a fixed portion of the propulsion unit, here on the motor 38 which is shown in FIG. 1 and which is arranged below the connecting rod 20.

In a non-limiting manner, the fixed portion, on which the connecting rod support 24 is mounted, may be the mast 14 which is arranged above the connecting rod 20.

Referring to FIG. 3, the connecting rod support 24 has a U-shape which comprises a soleplate 40 fastened on the motor 38, a soleplate 40 from which two walls 42a, 42b extend vertically facing each other symmetrically along a vertical plane, on either side of the tubular element 28 of the connecting rod 20.

Each wall 42a, 42b defines a slot 44a, 44b, each delimited by a peripheral edge 46a, 46b respectively.

Complementarily, the proximal end of the tubular element 28 of the connecting rod 20 is equipped with a ring 47 which includes two support fingers 48a, 48b.

As shown in FIG. 3, the support fingers 48a, 48b each extend generally longitudinally on either side of the tubular element 28, through one of the slots 44a, 44b respectively.

The slots 44a, 44b and the associated support fingers 48a, 48b are designed to allow a free displacement of the connecting rod 20 along the three longitudinal, transverse and vertical directions.

According to another aspect, the locking device 18 comprises a first centering device 50 of the connecting rod 20, shown in FIGS. 5 and 6, which includes a centering pin 52 cooperating with a first seat 54.

The centering pin 52 extends perpendicularly to the connecting rod 20, along a vertical axis, from the ring 47 of the tubular element 28 of the connecting rod 20.

The first seat 54 is formed in a plate 56 which is fastened on the locking mechanism 22, the plate 56 delimits a V-shaped notch 58.

The V-shaped notch 58 is arranged opposite to the associated centering pin 52, the notch 58 having two converging ramps which are adapted to cooperate with the centering pin 52 to guide the connecting rod 20 in an axially centered position relative to the locking mechanism 22.

According to another aspect of the present disclosure, the locking device 18 comprises a second centering device 60 of the connecting rod 20, shown in FIG. 4.

The second centering device 60 includes a second seat 62 which is formed by the soleplate 40 of the connecting rod support 24 and which has an upper face of generally V-shaped longitudinal section adapted to cooperate with the tubular element 28 of the connecting rod 20 in order to guide the connecting rod 20 in a centered position relative to the locking mechanism 22, in an open cowls configuration.

In addition, the locking device 18 comprises a helical spring 64 forming an elastic return element, which is interposed transversely between the distal end 30 of the sliding rod 26 and the associated tubular element 28 to the connecting rod 20.

Thus, the spring 64 allows elastically constraining the centering pin 52 of the tubular element 28 against the plate 56 of the first centering device 50, to stabilize the connecting rod 20 in the closed cowls flight configuration.

Also, the locking device 18 comprises a fuse element (not shown) which is interposed between the connecting rod 20 and the motor 38 and which is adapted to yield beyond a certain force in case of blocking of the connecting rod 20 during the opening or the closure of the movable cowls 10, 12.

Thus, the fuse element allows not damaging the motor, nor the first cowl 10 which is linked to the distal end 30 of the connecting rod 20. The fuse element may be for example integrated to the connecting rod support 24.

The implementation of the locking device 18 is described below.

In an open cowls configuration, shown in FIG. 2, the rod 26 of the connecting rod 20 is deployed and the tubular element 28 of the connecting rod 20 rests on the connecting rod support 24.

More specifically, as shown in FIGS. 4, 7 and 8, the two support fingers 48a, 48b, secured to the connecting rod 20, bear on the peripheral edge 46a, 46b of the slots 44a, 44b respectively.

Also, always in the open cowls configuration, with reference to FIG. 9, the proximal end of the tubular element 28 of the connecting rod 20 rests vertically on the second seat 62 of the second centering device 60, the second seat 62 allowing centering the connecting rod 20 relative to the locking mechanism 22, to promote the engagement of the rod 26 of the connecting rod 20 in the locking mechanism 22, during the closure of the cowls 10, 12.

When the cowls 10, 12 are driven from their open position, to their closed position, the spring 64 is compressed between the tubular element 28 of the connecting rod and the joint 32, then the free proximal end 34 of the rod 26 engages the locking mechanism 22.

To promote the engagement of the rod 26 in the locking mechanism 22 at the end of stroke of the cowls 10, 12, the centering pin 52 slips on the V-shaped notch 58 of the first centering device 50, until the rod 26 is blocked in the hollow of the notch 58.

Thus, the first centering device 50 blocks the tubular element 28 of the connecting rod 20 in transverse translation, which allows the spring 64 to compress the connecting rod 20.

Furthermore, by pressing against the notch 58, the centering pin 52 allows recentering the support fingers 48a, 48b generally in the middle of the associated slots 44a, 44b.

Once the cowls 10, 12 are closed, the connecting rod 20 is stabilized in transverse translation and in rotation under the effect of the spring 64 which pushes the centering pin 52 of the notch 58.

Referring to FIGS. 3 and 5, it will be noted that the locking device 18 is designed such that, in the closed cowls configuration, the support fingers 48a, 48b and the walls 42a, 42b of the connecting rod support 24 are not in contact and allow a displacement of the connecting rod 20, despite of the geometric tolerances and the relative displacement of the motor 38 and of the cowls 10, 12.

It will be also noted that that the connecting rod support 24 may be fastened on the mast, the walls 42a, 42b facing downwardly, without prejudice to the proper operation of the locking device 18.

According to another aspect, in order to allow the disassembly of the first cowl 10 to which the connecting rod 20 is fastened, several solutions may be envisaged.

A first solution includes an interface that links the connecting rod support 24 on the motor 38 and which is rapidly removable, this interface may be constituted by a plurality of screws and nuts for example.

A second solution involves making the two support fingers 48a, 48b removable.

Finally, a third solution involves arranging an opening in the upper portion of the slots 44a, 44b allowing disengaging the support fingers 48a, 48b.

According to one variant of the present disclosure shown in FIG. 10, the first centering device 50 of the connecting rod 20 is shifted on the side of the locking mechanism 22 to eliminate the vertical centering pin 52.

To this end, the plate 56 extends vertically on one side of the locking mechanism 22, the plate 56 delimiting a V-shaped notch 58 which is arranged facing the first support finger 48a, in the closed cowls configuration, so that the first support finger 48a cooperates with the notch 58 for guiding and centering the connecting rod 20 during the closure of the cowls 10, 12.

The description of the present disclosure is given by way of non-limiting example.

It will be understood that simple mechanical reversals are covered by the present disclosure, the slots 46a, 46b may be, for example, formed by the tubular element 28 of the connecting rod 20 and the associated support fingers 48a, 48b may extend from the walls 42a, 42b of the support 24 of connecting rod 20.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A locking device for locking a first cowl and a second cowl of a thrust reverser of an aircraft propulsion unit, said cowls each being pivotally mounted about a longitudinal axis between a flight closed position and a maintenance open position, the locking device comprising:
   a telescopic connecting rod comprising at least one rod that is slidably mounted along a transverse axis in a tubular element between a retracted position corresponding to a closed cowls configuration and a deployed position corresponding to an open cowls configuration, the at least one rod having a distal end linked on the first cowl and a proximal end adapted to be linked to the second cowl;
   a locking mechanism of the proximal end of the rod on the second cowl, the locking mechanism adapted to interlock said cowls in the closed position thereof; and
   a connecting rod support mounted on a fixed portion of the propulsion unit and designed to support the connecting rod at least in an open cowls configuration,
   wherein the connecting rod support or the tubular element of the telescopic connecting rod includes two walls which extend on either side of the tubular element of the telescopic connecting rod, each of the two walls delimiting a slot, and
   wherein the tubular element of the telescopic connecting rod or the connecting rod support carries two support fingers, each support finger extending longitudinally on either side of the tubular element and through one of said slots,
   said slots adapted to cooperate with the support fingers when the first and second cowls are open and to allow a free displacement of the support fingers in a closed cowls configuration.

2. The locking device according to claim 1, wherein the connecting rod comprises a first centering device er that includes at least one centering pin that extends perpendicularly to the telescopic connecting rod from the tubular element of the telescopic connecting rod, and a first associated seat having a V-shaped notch adapted to cooperate with the centering pin in order of the guide the telescopic connecting rod in a centered position relative to the locking mechanism and to block the tubular element of the telescopic connecting rod in transverse translation and in rotation about an axis of the telescopic connecting rod, in a closed cowls configuration.

3. The locking device according to claim 2, wherein the first seat of the first centering device and the locking mechanism are secured to the second movable cowl.

4. The locking device according to claim 2, wherein the tubular element of the telescopic connecting rod has a proximal end that includes a ring, said ring carrying the centering pin and two support fingers.

5. The locking device according to claim 2, wherein the centering pin of the first centering device is formed by one of said fingers of the connecting rod support.

6. The locking device according to claim 1, wherein the telescopic connecting rod comprises a second centering device that includes a second seat that is secured to a fixed portion of the propulsion unit and has a face with a V-shaped longitudinal section adapted to cooperate with the tubular element of the telescopic connecting rod in order to guide the telescopic connecting rod in a centered position relative to the locking mechanism, in an open cowls configuration.

7. The locking device according to claim 1 further comprising an elastic return element that is interposed transversely between the sliding telescopic connecting rod and the tubular element of the telescopic connecting rod.

8. The locking device according to claim 1 further comprising a fuse element that is interposed between the telescopic connecting rod and the fixed portion of the propulsion unit and is designed to yield beyond a certain force in case of blocking of the telescopic connecting rod during opening or closing of the movable cowls.

9. The locking device according to claim 1, wherein the fixed portion of the propulsion unit is a mast intended to link the nacelle on the aircraft.

10. The locking device according to claim 1, wherein the fixed portion of the propulsion unit is part of a motor of the propulsion unit.

* * * * *